United States Patent Office 3,585,097
Patented June 15, 1971

3,585,097
EXPANDABLE DRUM AND HEAT SEALING MEANS
Elmer C. Beason, Cincinnati, Ohio, assignor to Phillips Petroleum Company
Filed May 22, 1968, Ser. No. 731,249
Int. Cl. B30b *15/34;* B32b *31/20*
U.S. Cl. 156—583                                  3 Claims

ABSTRACT OF THE DISCLOSURE

In a drum the circumference may be varied by moving the side segments of the drum in a radial direction. The sides of the drum are made up of a series of side segments and each of the two end members of the drum is made up of a pair of end plates. One end plate in each pair of end members has a series of straight slots and the other end plate of that pair has a series of arcuate slots. By rotating one end plate with respect to the other end plate in each end member, the side segments which have been fitted into the slots will move in a radial direction thereby varying the circumference of the drum.

BACKGROUND OF THE INVENTION

This invention relates to an expandable drum. In one aspect this invention relates to a drum wherein the circumference of the drum may be varied. In another aspect this invention relates to an expandable drum which may be used to make plastic bags. In another aspect this invention relates to an expandable drum which may be used to heat seal a tubular plastic film for making plastic bags. In another aspect this invention relates to an expandable drum used to heat seal a tubular plastic film for making plastic bags wherein the length of the bag may be varied by varying the circumference of the drum.

In certain commercial processes such as bagmaking there has been a problem with making bags of different lengths on the same machine without making any time-consuming equipment changes on the bagmaking machine. This has been especially true in the case of the device used to heat seal the bags when plastic bags are being made. One problem that has been present is that when a thicker plastic is used, then more time is required to perfect the heat seal than with thinner material. Also, while the time the heat was applied was important, there was also a need to produce as many bags as possible in a continuous manner. It was found that if the plastic tubing used in making bags was rolled over a drum and the drum had a sealing bar running longitudinally along the side of the drum then the heat bar would be in contact with the plastic tubing for a sufficient amount of time and a continuous process was accomplished.

The use of the drum in the bagmaking machine worked very well when only one size of bag was desired. However, when it was necessary to make a bag of a different length then a drum of a new circumference had to be used. This required a period of time to change the drum and therefore a period of time in which the entire machine was out of operation.

It has been found that these problems can be overcome by use of the present invention. A drum whose circumference may be varied in a short amount of time still allows the advantages of using a drum to heat seal the bag material. Also, with the present invention there is no need to change drums when a new bag length is desired.

Therefore, it is the object of the present invention to provide a drum whose circumference may be varied in an easy manner. It is another object of the present invention to provide a drum which may be used in a bagmaking machine to vary the length of the bags without changing drums.

Other aspects, objects and the several advantages of the invention will be apparent from a study of the disclosure, the drawings, and the appended claims to the invention.

BRIEF DESCRIPTION OF THE DRAWINGS

In the drawings, FIG. 3 is an end view of the outside end plate as used in the end member in the present invention. FIG. 4 is an end view of the inside end plate as used in the end member in the present invention.

DESCRIPTION OF THE PREFERRED EMBODIMENT

Figure 1:
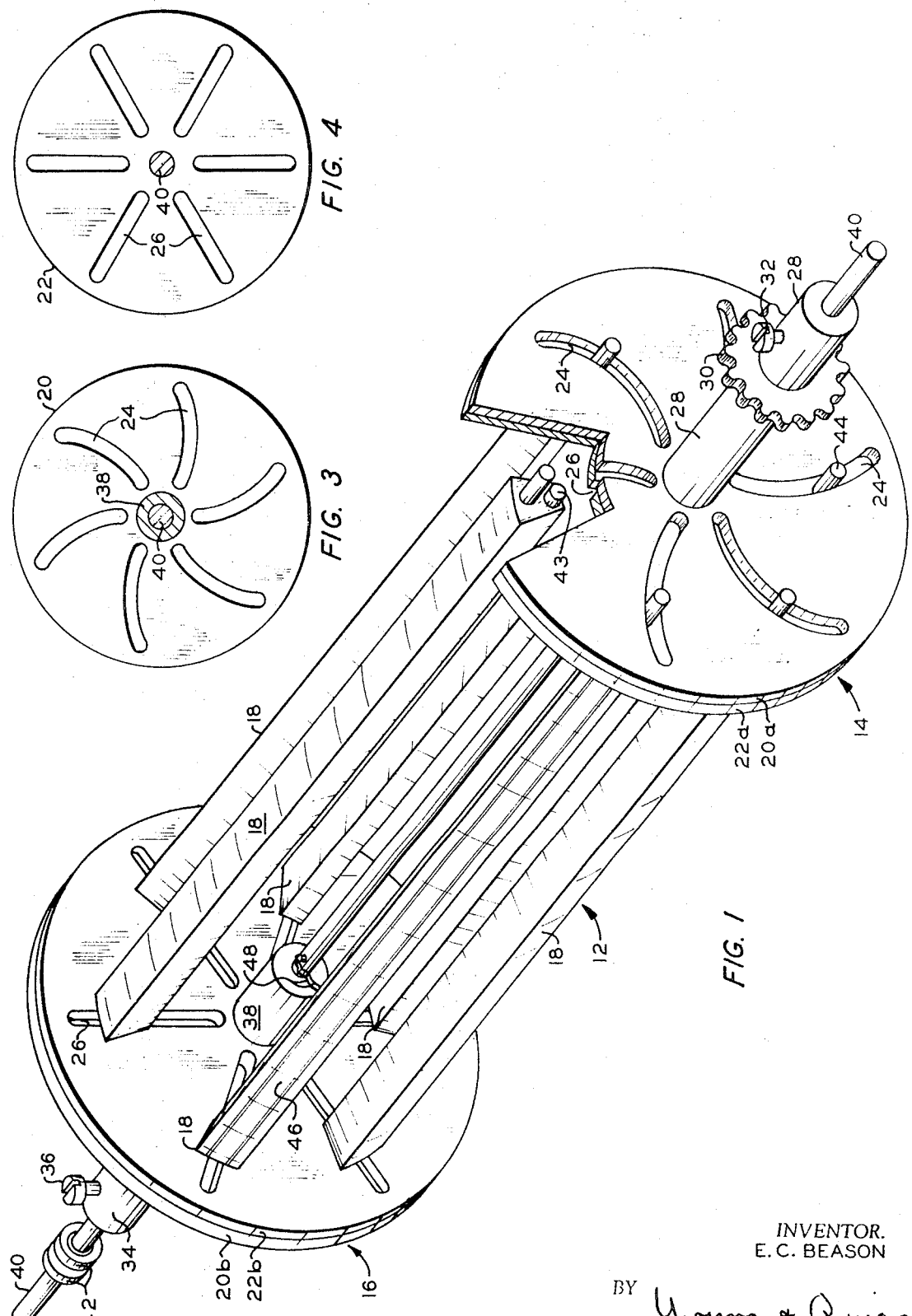
FIG. 1 is an axonometric view of an expandable drum in accordance with the present invention.

Referring to FIG. 1, an expandable drum 12 is made up of end members 14 and 16 and side segments 18. End members 14 and 16 are made up of a pair of circular end plates 20a, 20b, 22a and 22b. End plates 20a and 22a are used to form end member 14 and end plates 20b and 22b are used to form end member 16. End plates 20a and 20b are identical and contain six arcuate slots 24 as shown in FIG. 3. Arcuate slots 24 are formed uniformly about and extend radially from the centers of end plates 20a and 20b. End plates 22a and 22b are identical and contain six straight slots 26 as shown in FIG. 4. Straight slots 26 are formed uniformly about and extend radially from the centers of end plates 22a and 22b.

End plate 20a is connected to a hollow shaft 28 which has a sprocket gear 30 and a locking screw 32. End plate 20b is connected to a hollow shaft 34 which has a locking screw 36. End plates 22a and 22b have short collars 38 and are connected to a shaft 40. The size of shaft 40 is such that it will fit through hollow shafts 28 and 34. Also connected to shaft 40 are electrical slip rings 42 whose use will be described later. All of the end plates are connected to their respective shafts as described above so that the shafts pass through the centers of the end plates.

Side segments 18 have a curved outer surface and two pins 43 and 44 are located in each end of each side segment. The length of pins 44 is slightly greater than the width of end members 14 and 16 and the length of pin 43 is slightly less than the width of plate 22. One of side segments 18 contains a sealing bar 46 which extends the length of the side segment in which it is located. Sealing bar 46 is connected electrically with shaft 40 by electrical wires 48. It is understood that while a sealing bar is used in this disclosure, it would be possible to use other apparatus such as cutting blades in one or more of the side segments depending on the use of the drum. It is also understood that there may not be a need for any apparatus to be used in the side segments and only the expandable drum used.

Figure 2:
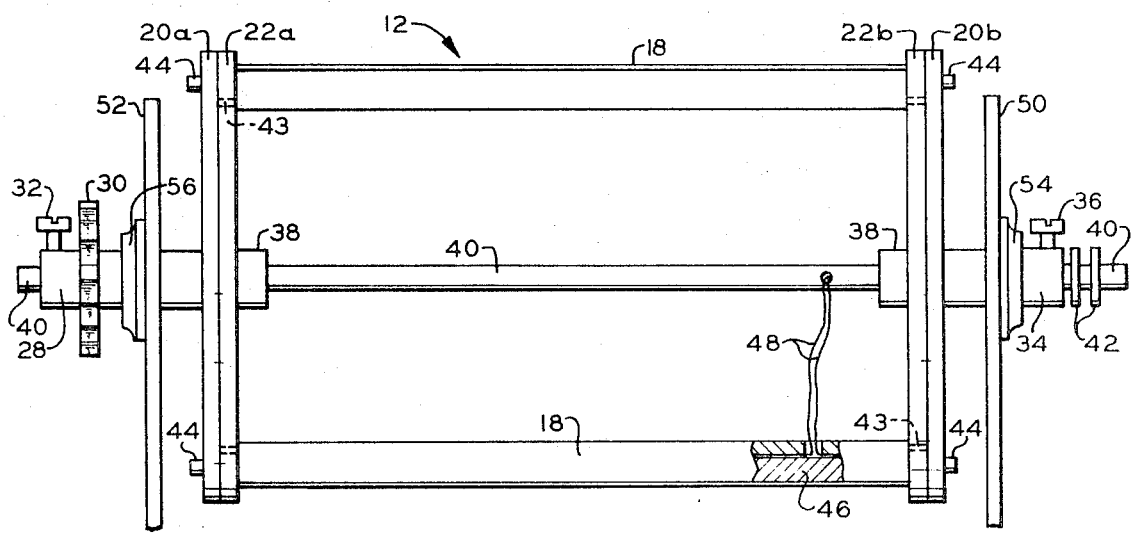
FIG. 2 is a side view of the expandable drum shown in FIG. 1.

FIG. 2 shows frames 50 and 52 and flange bearings 54 and 56 which are used to support the present invention. Only two of the side segments 18 are shown in FIG. 2 for the purpose of clarity.

End plates 20a and 22a are placed flush to each other as shown in FIG. 2 and the arcuate slots 24 of end plate 20a are aligned with the straight slots 26 in end plate 22a in such a manner as to allow pins 44 on the end of side segments 18 to be located through both plates. Likewise end plates 20b and 22b are placed and aligned and pins 44 are placed through these corresponding slots. Pins 43 extend into straight slots 26 but not into arcuate slots 24. Pins 44 and 43 hold segment 18 so it cannot rotate relative to plates 22 but only move radially. The end plates 22a and 22b are both connected to shaft 40 and the straight slots in end plate 22a will be aligned with the straight slots in end plate 22b so that side segments 18 will be perpendicular with the end members 14 and 16.

To vary the circumference of the drum 12 the locking screws 32 and 36 are first loosened. Next shaft 40 is rotated in either a clockwise or counterclockwise direction depending on whether the circumference is to be increased or decreased. Since end plates 22a and 22b are both connected to shaft 40 then when shaft 40 is rotated the end plates will also rotate together. While shaft 40, and consequently end plates 22a and 22b, is being rotated the other end plates 20a and 20b are held stationary. As the end plates 22a and 22b are being rotated and end plates 20a and 20b held stationary, the pins 44 will move in a radial direction due to straight slots 26. The amount pins 44 move in a radial direction will be controlled by the arcuate slots 24. Since pins 44 are located on the ends of side segments 18 then any radial movement by the pins will also cause radial movement of the side segments 18. Due to the aligning of straight slots 26 on each end plate as described above and due to the rotation of both end plates 22a and 22b in a simultaneous manner, all of the side segments 18 will move radially the same amount thereby giving a uniform circumference to the drum.

When the desired circumference is obtained by rotating shaft 40, the locking screws 32 and 36 are again tightened. This locks end plates 20a and 22a together and also locks end plates 20b and 22b together. This locking of the two end plates together on each end prevents the side segments 18 from moving while the drum is being used. During operation all of the parts of the drum will be rotating with shaft 40.

A sprocket drive 30 is provided on shaft 28 to connect shafts 28 and 40 with a driving means. For example, the sprocket drive 30 could be connected to an electrical motor by means of a chain drive. It is understood that while a sprocket drive is shown, any conventional type of driving means could be used to rotate the drum. The frames 50 and 52 and the flange bearings 54 and 56 which support the drum 12 and allow it to rotate are only suggested means to support the drum and any means which is known in the art which would support the drum and allow it to rotate could be used.

One of the side segments 18 contains a sealing bar 46 which runs the length of the side segment it is contained in. This sealing bar is heated by use of electrical wires 48 which run from the sealing bar 46 to shaft 40. Shaft 40 is hollowed between the point where wires 48 enter shaft 40 from sealing bar 46 and electrical slip rings 42. Wires 48 are insulated so that only sealing bar 46 is electrically charged. Sealing bar 46 is used to seal heat sealable material such as plastic film to produce bags. It is understood that other conventional apparatus might be used in place of the heat sealing bar or more sealing bar may be used. Several segments could contain heat sealing and/or cutting bars in various combinations.

Figure 5:
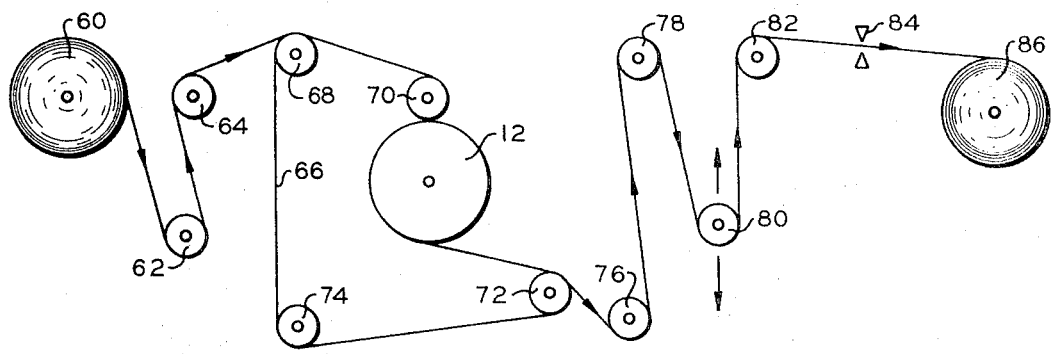
FIG. 5 is a diagrammatic representation of a bagmaking process wherein the present invention is used.

Referring now to FIG. 5, there is a diagrammatic representation of a bagmaking process wherein the present invention is used. A plastic tubular film, represented by the solid line with arrows, passes from a film roll 60, over a roller 62, over a roller 64 and onto a belt 66. Belt 66 is continuous and is supported by a roller 68, a roller 70, expandable drum 12, a roller 72 and an adjustable roller 74. While the plastic tubular film is on belt 66 it is run between the belt and expandable drum 12. As the drum rotates the sealing bar 46, described above, will come into contact with a portion of the plastic film with each rotation of the drum. Adjustable roller 74 permits belt 66 to be tightened or loosened whenever the circumference of the drum is changed. The belt 66 insures that the sealing bar makes the required contact with the plastic film in order to insure an adequate seal between the two sides of the plastic tubular film. The sealing bar will be in contact with the plastic film for approximately 180° of rotation of the drum. The length of the bags may be varied by changing the circumference of drum 12. When the circumference of drum 12 is small then the sealing bar will have a shorter distance to travel between heat seals and this will result in a shorter bag. As the circumference of drum 12 is increased the distance the sealing bar travels between heat seals will be increased and therefore the length of the bag will be increased.

After the plastic tubular film leaves contact with the belt it passes through a series of rollers 76, 78, 80 and 82. The roller 80 is known in the art as a dancing roller which moves in an up and down direction. After the film leaves the series of rollers it then moves to perforating knife 84 which perforates the plastic tubular film so that individual bags may be torn from the roll. Next the film is rolled up on a roller 86 in the form of heat sealed and perforated plastic bags such the ones placed over clothes by a cleaning establishment to protect the clean clothes or bags such as those used to line garbage cans.

Reasonable variations and modifications are possible within the scope of the foregoing disclosure, the drawings and the appended claims to the invention.

That which is claimed is:
1. An expandable drum comprising:
a central shaft;
first and second plates of corresponding configuration, each of which is provided with a plurality of radially extending straight slots spaced from one another;
third and fourth plates of corresponding configuration, each of which is provided with a plurality of arcuate slots which are spaced from one another;
means securing said first and second plates to said shaft in spaced relationship with one another so that corresponding slots of said first and second plates have the same alignment relative to said shaft;
a plurality of side members extending between said first and second plates, each of said side members having first and second pins extending from first ends thereof and third and fourth pins extending from second ends thereof, said first pins being longer than said second pins and said third pins being longer than said fourth pins, the first and third pins of each side member extending through corresponding respective slots in said first and second plates, and the second and third pins of each side member extending into corresponding respective slots in said first and second plates; and
means adjustably securing said third and fourth plates to said shaft adjacent said first and second plates, respectively, so that said first and third pins extend into respective slots of said third and fourth plates third and fourth plates to be secured to said shaft at different positions relative to said first and second plates to thereby adjust the radial displacements of said side members from said shaft.

2. The drum of claim 1 wherein said adjustably securing means comprise first and second hollow shafts enclosing said central shaft and secured to said third and fourth plates, respectively, and locking means to secure each of said hollow shafts to said central shaft.

3. The drum of claim 1, further comprising a sealing bar secured to and extending along the outer edge of one of said side members.

References Cited

UNITED STATES PATENTS 1,955,949  4/1934  Colton _____ 53—291X
3,394,245  7/1968  Waldrop _____ 156—583X BENJAMIN A. BORCHELT, Primary Examiner J. J. DEVITT, Assistant Examiner U.S. Cl. X.R.

156—582